United States Patent [19]
Jung et al.

[11] Patent Number: 5,892,802
[45] Date of Patent: Apr. 6, 1999

[54] TRANSPORTING USER DATA OVER A-BIS AND A-INTERFACES WITHIN A MOBILE TELECOMMUNICATIONS NETWORK

[75] Inventors: Stefan Jung; Peter Galyas, both of Täby, Sweden

[73] Assignee: Telefonaktiebolaget L M Ericsson (publ), Stockholm, Sweden

[21] Appl. No.: 746,756

[22] Filed: Nov. 14, 1996

[51] Int. Cl.[6] .............................. H04L 7/00; H04L 5/14; H04J 3/06; H04Q 7/01

[52] U.S. Cl. .................... 375/354; 375/356; 375/365; 370/296; 370/503; 370/514; 455/552; 455/426; 455/518

[58] Field of Search .................. 375/354, 356, 375/365; 370/295, 503, 514, 509, 512; 455/552, 426, 518, 520, 524, 525, 452, 437, 517, 445

[56] References Cited

U.S. PATENT DOCUMENTS

| | | | |
|---|---|---|---|
| 4,450,558 | 5/1984 | Hampton et al. | 370/106 |
| 5,375,119 | 12/1994 | Koivu | 370/401 |
| 5,390,216 | 2/1995 | Bilitza et al. | 375/106 |
| 5,506,837 | 4/1996 | Sollner et al. | 370/296 |
| 5,612,992 | 3/1997 | Dupuy et al. | 370/350 |
| 5,740,166 | 4/1998 | Ekemark et al. | 370/331 |

*Primary Examiner*—Chi H. Pham
*Assistant Examiner*—Khai Tran
*Attorney, Agent, or Firm*—Jenkens & Gilchrist, P. C.

[57] ABSTRACT

A synchronization frame is first formatted and transmitted in accordance with the Global System for Mobile (GSM) 08.60 specification. After an initial synchronization procedure is accomplished between a transcoder/rate adaptor unit (TRAU) and a particular base transceiver station (BTS) serving a mobile station, a modified GSM 08.60 frame is thereafter used to transport greater user data payload across the established communications link. The modified frame replaces the synchronization bits included in the GSM 08.60 formatted data frame with user data to increase data payload from the conventional 13.5 Kbit/s to a more desirable 14.4 Kbit/s without altering the standardized 16 Kbit/s transmission rate supported by the IWF and the BTS.

26 Claims, 5 Drawing Sheets

FIG.2

| Word No. \ Bit no. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 |
| 2 | 1 | $C_1$ | $C_2$ | $C_3$ | $C_4$ | $C_5$ | $C_6$ | $C_7$ | $C_8$ | $C_9$ | $C_{10}$ | $C_{11}$ | $C_{12}$ | $C_{13}$ | $C_{14}$ | $C_{15}$ |
| 3 | 1 | | | | | | | | | | | | | | | |
| 4 | 1 | | | | | | | | | | | | | | | |
| 5 | 1 | | | | | | | | | | | | | | | |
| 6 | 1 | | | | | | | | | | | | | | | |
| 7 | 1 | | | | | | | | | | | | | | | |
| 8 | 1 | | | | | | | Data sector | | | | | | | | |
| 9 | 1 | | | | | | | | | | | | | | | |
| 10 | 1 | | | | | | | | | | | | | | | |
| 11 | 1 | | | | | | | | | | | | | | | |
| 12 | 1 | | | | | | | | | | | | | | | |
| 13 | 1 | | | | | | | | | | | | | | | |
| 14 | 1 | | | | | | | | | | | | | | | |
| 15 | 1 | | | | | | | | | | | | | | | |
| 16 | 1 | | | | | | | | | | | | | | | |
| 17 | 1 | | | | | | | | | | | | | | | |
| 18 | 1 | | | | | | | | | | | | | | | |
| 19 | 1 | | | | | | | | | | | | | | | |
| 20 | 1 | | | | | | | | | | | | | | | |

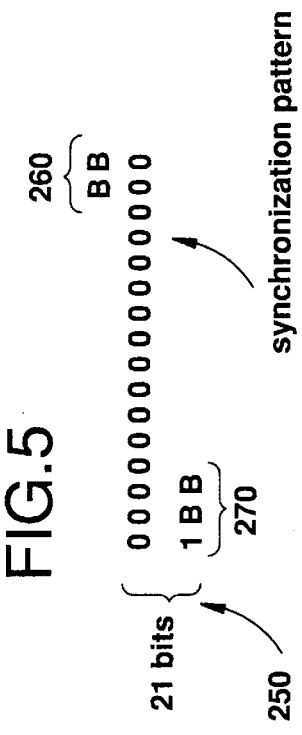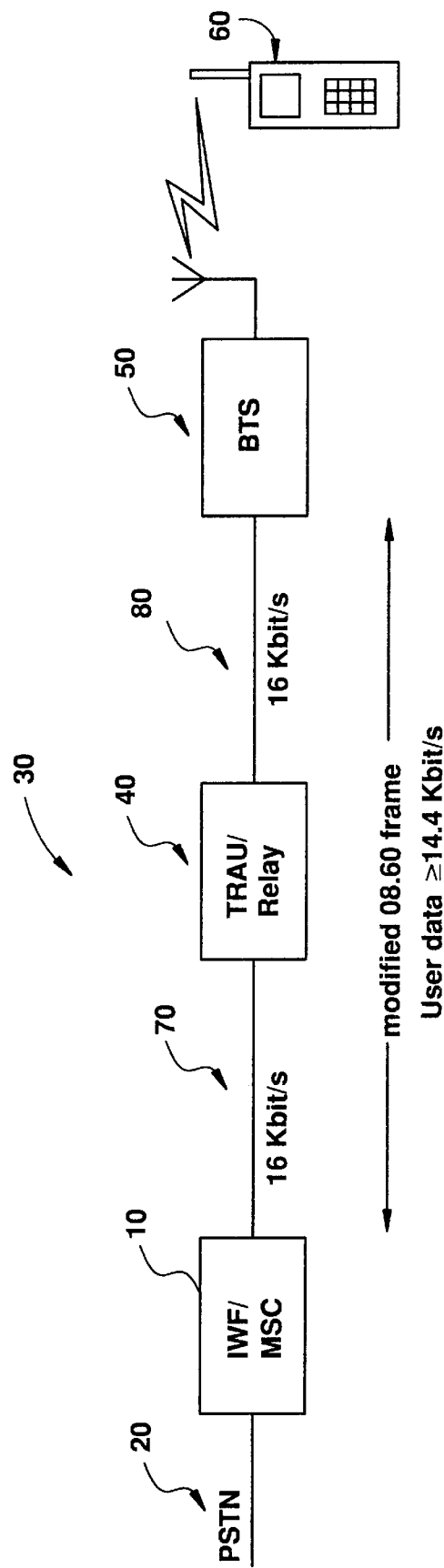

TRANSPORTING USER DATA OVER A-BIS AND A-INTERFACES WITHIN A MOBILE TELECOMMUNICATIONS NETWORK

BACKGROUND OF THE INVENTION

1. Technical Field of the Invention

The present invention relates to a telecommunications network and, in particular, to the transportation of user data over A-Bis and A-interfaces within a public land mobile network.

2. Description of Related Art

With the continuing development of mobile telecommunications systems, such as the Global System for Mobile (GSM) communications standard, mobile subscribers and associated mobile terminals are able to communicate non-speech user data over the existing mobile telecommunications network at a much faster data rate than at a conventional speech data rate. Such data services include ISDN connections, facsimile transmission, modem connection, and other specified bearer services as set forth within the GSM specifications. As a result, a telecommunications module known as an Interworking Function (IWF) has been developed to enable the transmission and protocol adaptation of such user data from one telecommunications network to another associated telecommunications network. Accordingly, the IWF enables interconnection with networks such as Packet-Switched Public Data Networks (PSPDNs) or Circuit-Switched Public Data Networks (CSPDNs). Furthermore, it is also used when the connected network is simply the Public Switched Telephone Network (PSTN) or Integrated Service Digital Network (ISDN). Such an IWF may be implemented together with the mobile switching center (MSC) function, or it may be performed by separate equipment. Because the IWF communicates such data using a first protocol transmitted over a first data rate, and because a base transceiver station (BTS) serving a particular mobile station communicates the same data using a second protocol transmitted over a second data rate, another device known as a Transcoder/Rate Adaptor Unit (TRAU) is placed therebetween. A first communication link established between an IWF and a corresponding TRAU is known as an A-interface, and a second communication link established between the TRAU and a serving BTS is known as an A-Bis interface. The interconnecting TRAU then functions to facilitate the communication of data between the two incompatible communications links.

In accordance with the International Telegraph and Telephone Consultative Committee (CCITT) specifications, for example, data frames formatted as set forth in the CCITT V110 specification are communicated over the A-interface with a 9.6 Kbit/s user data rate. Similarly, data frames formatted as set forth in the GSM 08.60 specification are communicated over the A-Bis interface with a 13.5 Kbit/s user data rate. The interconnecting TRAU then performs the data transformation and adaption between the connected A-interface and the A-Bis interface.

With increasing demands of high capacity data communication within a mobile telecommunications network, mobile subscribers and associated applications are demanding a 14.4 Kbit/s user data transmission rate from the serving network. However, since the serving A-interface is capable of transporting only 9.6 Kbit/s user data, and the corresponding A-Bis interface is capable of transporting only 13.5 Kbit/s user data, a highly demanded 14.4 Kbit/s data connection with a mobile terminal is conventionally not achievable.

A number of solutions have been introduced to solve the above data payload problem. One such solution is to use "double TRAU" frames to communicate 14.4 Kbit/s data payload between the serving BTS and the IWF. Two consecutive TRAU frames formatted in accordance with the GSM 08.60 specification are used to accomplish 16 Kbit/s for the frames and to include 14.4 Kbit/s user data payload. Since each TRAU frame has a duration of 20 ms, the double TRAU frames are transmitted with a duration of 40 ms.

However, since all applicable modules, such as channel coding blocks, residing within the serving BTS are based on 20 ms data frames, by introducing 40 ms frames, the applicable modules need to be extensively modified and altered to buffer incoming data received from the TRAU and to delay transmitting outgoing data received from mobile terminals. Furthermore, since the GSM specification mandates communicating 20 ms frames over the A-bis interface, by introducing a different frame duration, general incompatibility problems are created within the serving mobile telecommunications network.

Accordingly, there is a need for a mechanism to transport 14.4 Kbit/s user data payload over the serving mobile telecommunications network while maintaining the 20 ms frame duration within the A-Bis interface.

SUMMARY OF THE INVENTION

The present invention discloses a method and apparatus for transporting 14.4 Kbit/s user data payload between an interworking function (IWF) node and a serving base transceiver station (BTS) using modified GSM 08.60 based data frames with reduced synchronization bits. First, a 20 ms data frame capable of transporting 13.5 Kbit/s user data is used to synchronize a communications link between a Transcoder/Rate Adaptor Unit (TRAU) and a serving base transceiver station (BTS). The transmitted data frame comprises a plurality of data words, each word further comprising sixteen (16) data bits. The very first word of the transmitted data frame is initialized with sixteen zeroes to represent initial synchronization data. The very first bits of the rest of the words are further initialized with the value of one to represent additional synchronization data. By first transmitting the GSM 08.60 formatted data frame, synchronization is performed and a communication link therebetween is established. Thereafter, modified GSM 08.60 data frames are transmitted between the serving BTS and the TRAU to transport 14.4 Kbit/s user data payload. In the modified frame, the first bit from the third word and thereafter representing the additional synchronization data in the conventional GSM 08.0 frame is stripped away and used instead to transport additional user data. Thus, the modified GSM 08.60 frames are capable of facilitating 14.4 Kbit/s user data rate. Such modified GSM 08.60 data frames are transported unaltered all the way from the serving BTS to the IWF in a similar manner to achieve the 14.4 Kbit/s data payload rate over the A and A-Bis interfaces.

BRIEF DESCRIPTION OF THE DRAWINGS

A more complete understanding of the method and apparatus of the present invention may be had by reference to the following detailed description when taken in conjunction with the accompanying drawings wherein:

FIG. 2 is a block diagram of a data frame formatted in accordance with the GSM 08.60 specification;

FIG. 5 is a block diagram of a bit window for detecting frame slipping; and

FIG. 6 is a block diagram of a communication link established between the serving interworking function (IWF) and the serving BTS in accordance with the teachings of the present invention.

DETAILED DESCRIPTION OF THE DRAWINGS

Figure 1:
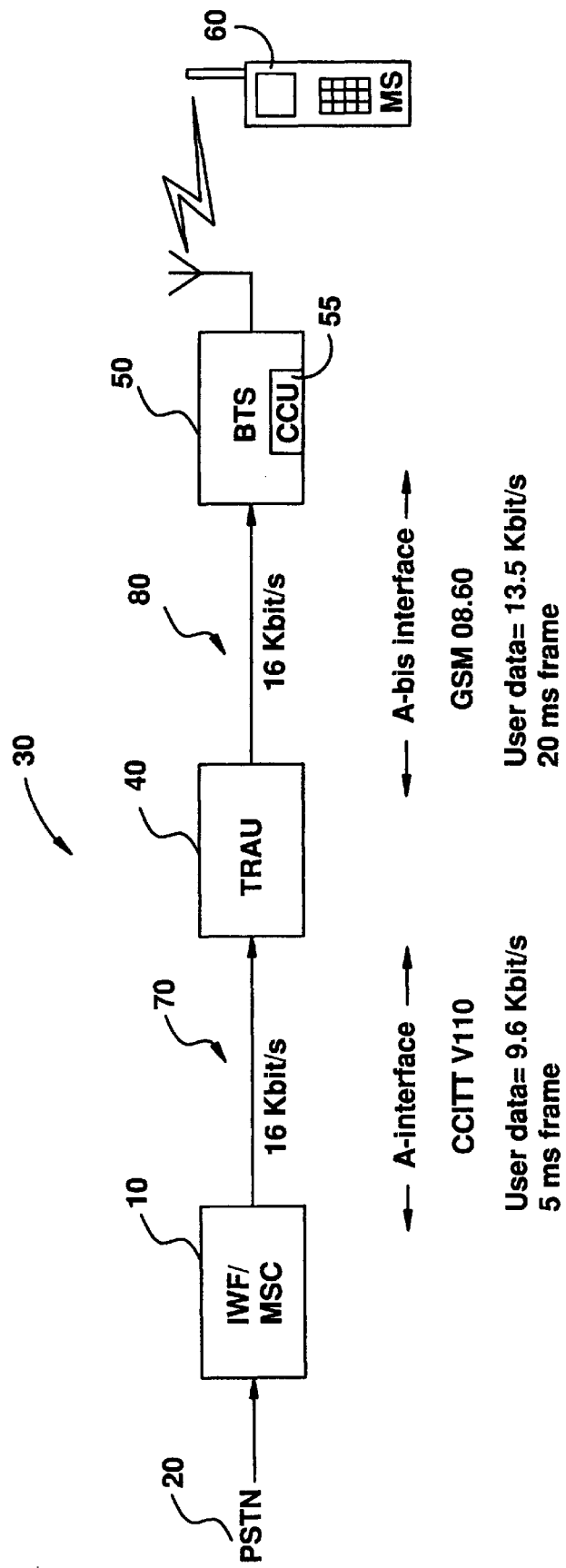
FIG. 1 is a block diagram of a communication link comprising an A-Bis and A-interfaces to transport user data from a connected telecommunications network to a mobile station.

FIG. 1 is a block diagram of a communication link for transporting user data from a connected telecommunications network, such as a Public Switched Telephone Network (PSTN) 20, to a mobile station 60. With the further development of user applications within a Public Land Mobile Network (PLMN), a number of high capacity non-speech data services have been introduced. Such services include all circuit switched data services as defined in TS GSM 02.02 and TS GSM 02.03 as well as other GSM phase 2+ services including facsimile transmission, High Speed Circuit Switched Data (HSCSD), high speed modem connections, and General Packet Radio Services (GPRS). As a result, a telecommunications module known as an Interworking Function (IWF) 10 has been developed to enable the transmission and protocol adaptation of such user data from one telecommunications network, such as the connected PSTN 20, to the serving PLMN 30. The IWF 10 may often be co-located with a particular mobile switching center (MSC) serving a designated geographic area (as shown in FIG. 1) or may be implemented as a separate telecommunications node. The IWF 10 is then connected to a Transcoder/Rate Adaptor Unit (TRAU) 40. The TRAU 40 is then further connected to a number of base transceiver station (BTS, only one shown in FIG. 1) 50 providing radio coverage for mobile station(s) 60 located within the serving MSC coverage area.

A communications link 70 established between the IWF 10 and the TRAU 40 is known as an "A-interface" within the Global System for Mobile (GSM) system, and uses International Telegraph and Telephone Consultative Committee (CCITT) V110 formatted frames to communicate user data therebetween. The A-interface 70 is capable of transporting 16 Kbit/s data per channel while communicating 5 ms CCITT V110 frames carrying 9.6 Kbit/s user data payload. The remaining bandwidth (16 Kbit/s minus 9.6 Kbit/s) is utilized for synchronization and control data transport to facilitate the communication of the 9.6 Kbit/s user data payload between the serving IWF 10 and the TRAU 40. A communications link 80 established between the TRAU 40 and the serving BTS 50 is known as an "A-Bis" interface within the GSM specification. In accordance with the GSM 08.60 specification, which specifies the format of speech and data frames between a BTS 50 and the TRAU 40 when the TRAU 40 is located remotely from the BTS 50, the A-Bis interface 80 provides a 16 Kbit/s data rate while transporting GSM 08.60 formatted 20 ms data frames. Data are transferred between a Channel Codec Unit (CCU) 55 within the BTS 50 and the TRAU 40 by using "TRAU frames" formatted in accordance with the GSM 08.60 specification. Within these frames, speech/data, synchronization pattern, and TRAU associated control data are included and transmitted. As a result, out of the 16 Kbit/s data, only 13.5 Kbit/s are utilized to transport user data and the remaining bandwidth is utilized to communicate synchronization and control data therebetween. The TRAU 40 performs the necessary transcoding and rate adaption to facilitate the communication of user data between the IWF 10 and the BTS 50.

With increasing demands of high capacity data applications, mobile subscribers and associated mobile terminals are demanding a 14.4 Kbit/s user data transmission rate from the serving mobile network. However, as illustrated above, since the A-interface 70 is capable of transporting only 9.6 Kbit/s user data payload and the A-Bis interface 80 is capable of transporting only 13.5 Kbit/s user data payload, the demanded higher capacity data transmission rate is not achievable using the existing protocols.

Reference is now made to FIG. 2 illustrating a data frame utilized for transporting user data over the A-Bis interface and formatted in accordance with the GSM 08.60 specification. Each data frame 100 is comprised of 320 data bits organized into a number of data words. Each data word is then comprised of sixteen data bits. Accordingly, there are sixteen bits per data word, and twenty words per data frame, constituting in total three hundred twenty bits. In order to enable the synchronization of transmitted data frames, the very first word of each data frame is initialized with zeroes and the very first bits of each subsequent word are initialized with the value of one. As a result, sixteen zeroes 110 are placed at the very first word of each data frame 100 followed by nineteen ones 120 placed one per each following word at bit location number one. The remaining fifteen bits C1–C15 within the second word are utilized to transport necessary control data 130. The rest (data sector 140) of the data frame is then available to transport user data. Since 50 bits out of 320 bits are utilized for synchronization and control data, only 270 bits are remaining per frame to transport user data over the A-Bis interface. Since the frame cycle for GSM 08.60 formatted frames is 20 ms, fifty such frames can be transported per second resulting in a 13.5 Kbit/s (270×50) user data payload rate over the resulting A-Bis interface.

Figure 3:
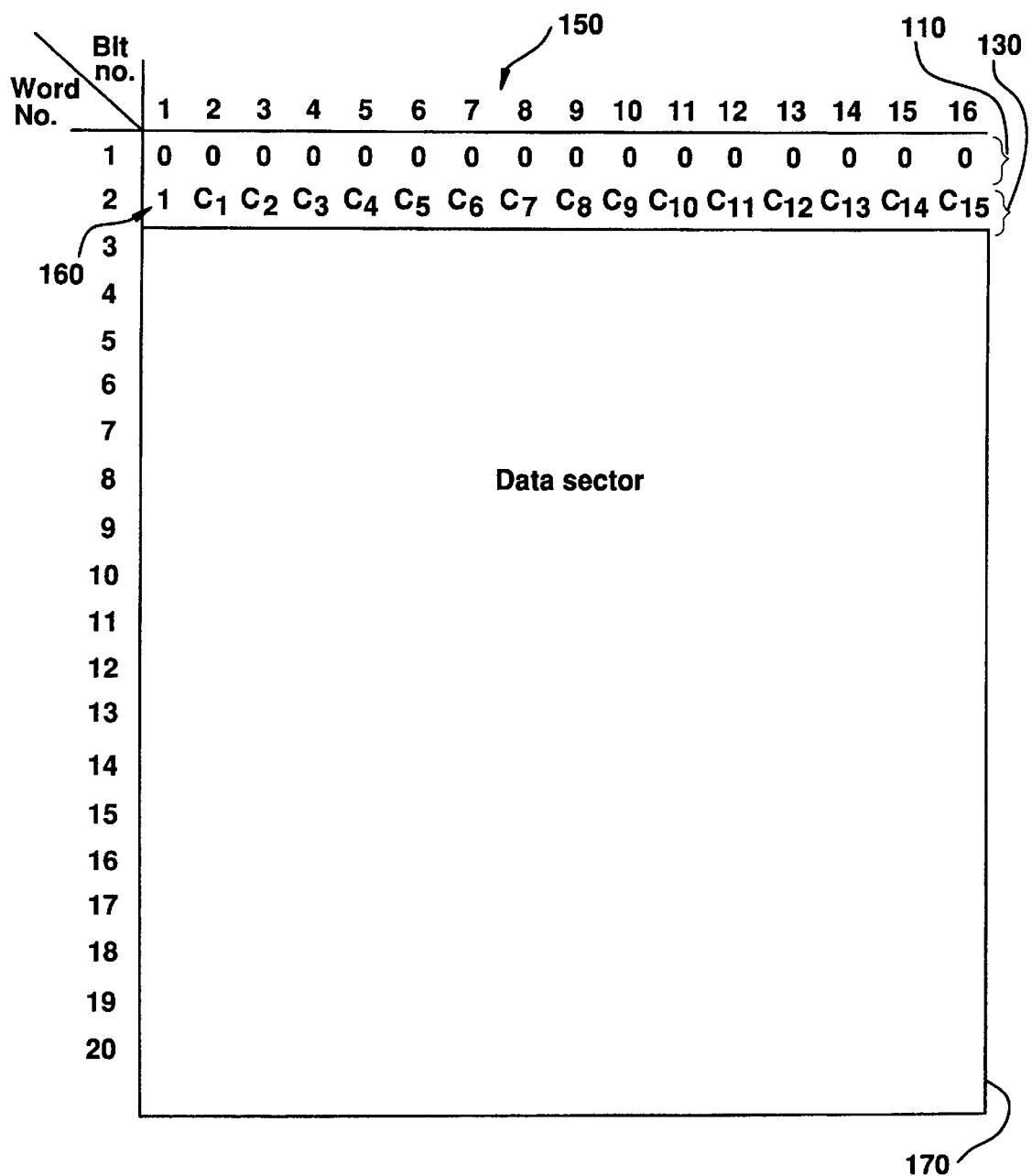
FIG. 3 is a block diagram of a modified data frame formatted in accordance with the teachings of the present invention.

FIG. 3 is a block diagram of a modified data frame 150 formatted in accordance with the teachings of the present invention. In order to increase the user data payload without altering the frame size or duration, or overall transmission rate, the existing GSM 08.60 based data frame is modified to transport added user data. The first word 110 of each data frame 150 is still initialized with sixteen zeroes to represent the synchronization data. The very first bit 160 of the second word within each data frame is further initialized with the value of one. The remaining bits C1–C15 130 within the second word are utilized for communication control data in a conventional manner. The remaining eighteen words (i.e., bits 1–16 of words 3–20) comprising the data sector 170 are then utilized to transport user data over the A-Bis interface in accordance with the teachings of the present invention. Since eighteen words at sixteen bits each comprise two hundred eighty eight bits, fifty such frames constitute a 14.4 Kbit/s user data payload rate. If a greater data rate is further required, some of the spare bits within the control data C1–C15 130 can further be utilized to transport additional user data. By removing some of all of the control bits, up to 15.5 Kbit/s user data rate can be achieved.

Figure 4:
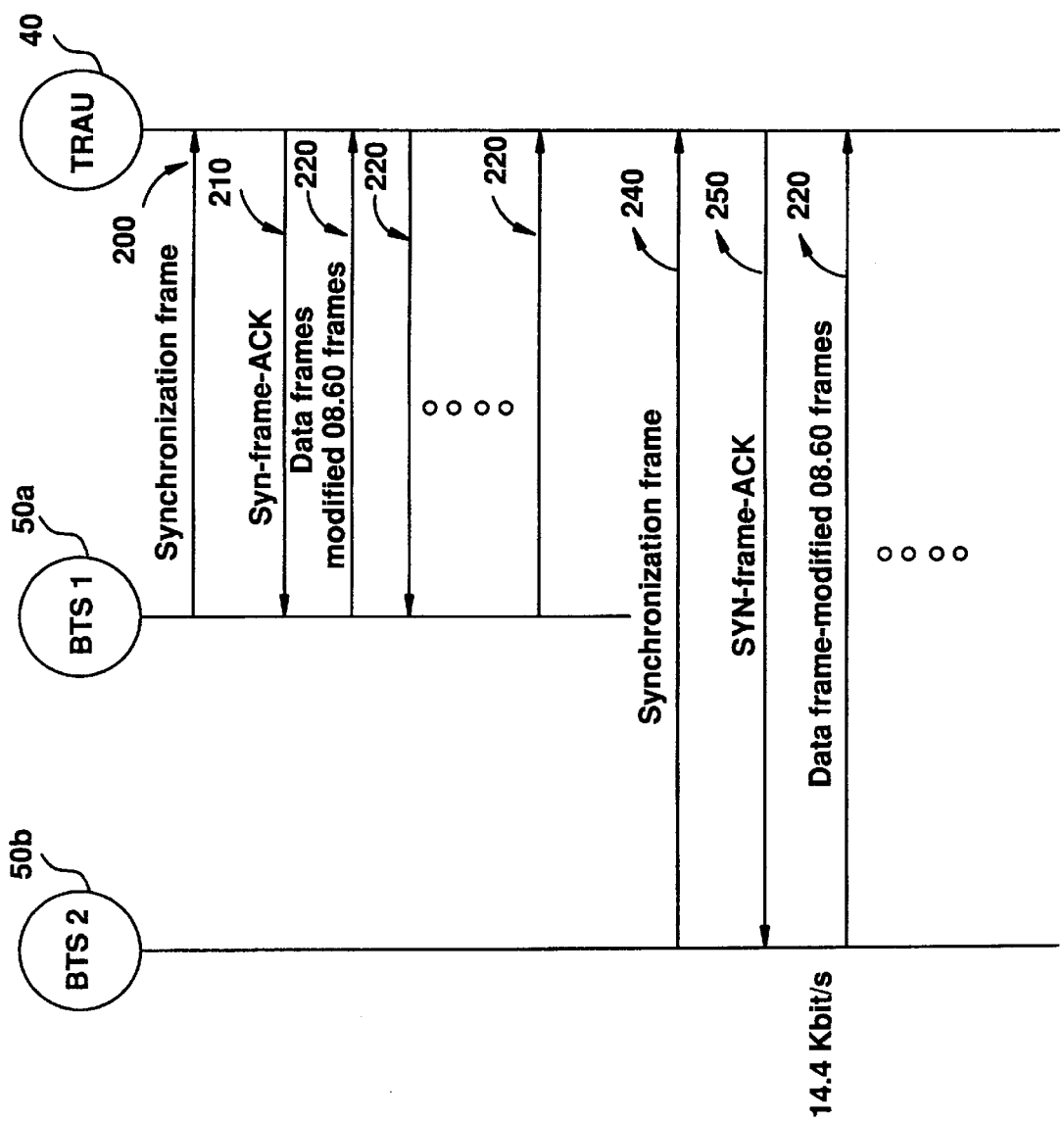
FIG. 4 is a signal sequence chart illustrating the synchronization and transportation of user data between the serving base transceiver stations (BTSs) and the connected Transcoder/Rate Adaptor Unit (TRAU)

FIG. 4 is a signal sequence chart illustrating the synchronization and transportation of user data between serving base transceiver stations (BTSs) 50a–50b and the connected Transcoder/Rate Adaptor Unit (TRAU) 40. In response to a channel activation request from a base station controller (BSC, not shown in FIG. 4), the first BTS 50a transmits a synchronization frame 200 to the requesting TRAU 40. Due to a long interleaving depth for the 14.4 Kbit/s data channel decoding, there would not be any user data available to be transmitted during the initial synchronization procedure. As a result, the transmitted synchronization frame 200 does not contain any user data and is merely transmitted to synchronize and to establish a communications link. Accordingly, with no need to transport 14.4 Kbit/s user data payload with the initial synchronization frame, the transmitted TRAU frame 200 is formatted in accordance with the standard GSM 08.60 specification as fully described in FIG. 2. Such bit patterns will guarantee that a false synchronization will not occur on a static pulse code modulation (PCM) link, such as the A-Bis interface. The TRAU 40 then scans the incoming bit stream, testing every bit and its contiguous bits for the presence of the predetermined synchronization bit pattern. If the predetermined synchronization bit pattern is detected by the TRAU 40, an acknowledgment signal 210 is then transmitted back to the first BTS 40a. The TRAU 40 and the first BTS 50a are then "in sync" with each other, and user data communications is now enabled. Accordingly, after the initial synchronization procedure, the TRAU 40 and the first BTS 50a have found the phase of the synchronization frames and will start monitoring that phase for data communication. For such monitoring of subsequent data frames for data communications, modified GSM 08.60 data frames called "Data Frames", and as fully described in FIG. 3, are used in accordance with the teachings of the present invention. As described above, some of the synchronization bits within the TRAU frame 150 are removed and utilized for transmitting additional user data. Furthermore, an indication is placed within one of the control data to indicate that the transmitted data frame is formatted in accordance with the modified GSM 08.60 specification. Accordingly, data frames 220 are transported between the first BTS 50a and the TRAU 40 with 14.4 Kbit/s user data payloads while using the same frame synchronization position as established by the initial synchronization frame 200. In this steady-state condition where only synchronous Data Frames (modified GSM 08.60 based data frames) 220 are transmitted, there is a need to handle frame-slips over the A-Bis interface. The effect will be that two bits are misplaced during such a frame-slip. Such a misplacement must be immediately detected and corrected in order to prevent data shifting and other related transmission errors. Reference is now made to FIG. 5 illustrating a bit window for detecting a frame slip. A wider search window 250 of twenty one bits is placed at an expected synchronization pattern position (sixteen zeroes followed by a one) within a communicated Data Frame. Since, the misplacement of two bits will occur either at the front 260 or the end 270 of a Data Frame, by scanning additional two bits at the front and at the end of each synchronization pattern, such a frame slip can be located and the corresponding synchronization position can be accordingly readjusted. Due to a more severe disturbance, if the frames cannot be re-aligned within the search window 250, the initial synchronization procedure is reactivated to re-synchronize the frame position. As an illustration, if the BTS 50a loses the synchronization, it will send another synchronization frame 200 and re-trigger the initial synchronization procedure as described above in FIG. 4. On the other hand, if the TRAU 40 loses the synchronization position, it will indirectly trigger the initial synchronization procedure by communicating inband signaling with an Uplink Framing Error (UFE) bit as defined in TS GSM 08.60 for Enhanced Full Rate Speech. The BTS 50 then recognizes that the TRAU 40 has lost the synchronization position and another synchronization frame 200 is similarly transmitted to re-initiate the initial synchronization procedure as fully described in FIG. 4.

In case the associated mobile station has traveled out of the first BTS 50a coverage area and traveled into a second BTS 50b coverage area, the first BTS 50a needs to hand over the connection over to the newly serving second BTS 50b. As a result, the synchronization position also has to be monitored to detect such an intra base station controller (BSC) handover (the first BTS 50a and the second BTS 50b are associated with the same BSC and, in turn, such a handover is labeled as an intra-BSC handover). Referring back to FIG. 4, assume the mobile station has traveled into the second BTS 50b coverage area and needs to receive mobile service through the new BTS 50b. The second BTS 50b, in turn, transmits a new synchronization frame 240 formatted in accordance with the GSM 08.60 specification toward the associated TRAU 40. Since the transmitted synchronization frame 240 comprises sixteen zeroes followed by nineteen ones, it guarantees a "hit" in one of the sixteen zeroes transmitted by the first BTS 50a as the synchronization pattern. As a result, the TRAU 40 detects such a hit and recognizes that an intra-BSC handover has occurred. In response, the TRAU 40 re-synchronizes its position with the second BTS 50b and further transmits an acknowledgment signal 250 back to the second BTS 50b. The only exception to the above situation is where the new frame position specified by the second BTS 50b coincides with the synchronization position already established between the first BTS 50a and the associated TRAU 40. Such a coincidence further includes the two bit frame slip as further described in FIG. 5. However, in that scenario, no re-synchronization, other than the readjustment required for the frame slip, is needed between the second BTS 50b and the associated TRAU 40. Thereafter, 14.4 Kbit/s user data transmission is facilitated using the Data Frame (modified GSM 08.60 frame) 220 as fully described above.

Reference is now made to FIG. 6 illustrating a communications link established between the serving IWF 10 and the serving BTS 50 in accordance with the teachings of the present invention. Instead of utilizing two different types of data rates and frame protocols for transporting user data over the A-interface 70 and the A-Bis interface 80, Data Frames (modified GSM 08.60 data frame) 150 as fully described above are transported unaltered across the IWF-BTS connection 30. Therefore, after the data communication is established between the serving BTS 50 and the TRAU 40 as fully described above, a communication link 70 is established between the TRAU 40 and the IWF 10 in a similar manner. Accordingly, an initial synchronization frame 100 formatted as set forth in the GSM 08.60 specification is transmitted to synchronize a frame connection between the TRAU 40 and the IWF 10. Thereafter, Data Frames 150 formatted in accordance with the teachings of the present invention and received over the connected A-Bis interface are communicated to transport 14.4 Kbit/s user data payload to the IWF 10. As a result, no incompatibility of data rate or frame protocol exists between the A-interface 70 and the A-Bis interface 80. Accordingly, the TRAU 40 no longer needs to function as a rate adaptor and merely functions as a data relay device interconnecting the two communications link with each other.

Accordingly, by modifying an existing GSM based data frame, 20 ms frame duration and 16 Kbit/s overall transmission rate are maintained avoiding costly redesigning of GSM infrastructure within the serving mobile telecommunications network.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A communication system for communicating user data between a mobile station and a telecommunications network, comprising:
   a first telecommunications node for communicating user data with said telecommunications network;
   a second telecommunications node for communicating said user data with said mobile station;
   a rate adaptor;
   a first communications link connecting said first telecommunications node with said rate adaptor;
   a second communications link connecting said second telecommunications node with said rate adaptor;
   a first frame including first synchronization data is transportable over said second communications link for establishing and synchronizing communications between said second telecommunications node and said rate adaptor; and
   a second frame transportable over said second communication link for transporting said user data between said second telecommunications node and said rate adaptor, said second frame has a greater user payload than capable in the first frame because a portion of the first synchronization data in the first frame is replaced with additional user data, wherein said user data includes the addition user data.

2. The system of claim 1 wherein said first telecommunications node comprises an Interworking Function node within said PLMN.

3. The system of claim 1 wherein said second telecommunications node comprises a base transceiver station communicating with said mobile station.

4. The system of claim 1 wherein said first communications link comprises an A-interface in accordance with a Global System for Mobile communications specification.

5. The system of claim 1 wherein said second communication link comprises an A-Bis interface in accordance with a Global System for Mobile communications specification.

6. The system of claim 1 wherein said rate adaptor comprises a Transcoder/Rate Adaptor Unit.

7. The system of claim 1 wherein said second frame is capable of transporting said user data at a rate of 14.4 Kbit/s or greater.

8. The system of claim 1 wherein said second frame further includes an indication for indicating that said second frame is transporting at a user data rate of 14.4 Kbit/s or greater.

9. The system for claim 1 wherein said second frame further includes a plurality of words where a first word includes second synchronization data, and a first bit of a second word includes said second synchronization data, and remaining words of said plurality of words include said user data.

10. The system of claim 1 where a selected one of the rate adaptor and the second telecommunications node further includes a search window for detecting a frame slip within the second frame.

11. A method for communicating user data between a first telecommunications node and a second telecommunications node within a telecommunications network, said method comprising the steps of:
   transmitting a first frame including synchronization data, said first frame formatted in accordance with a first communication protocol from said first telecommunications node to said second telecommunications node, said transmission of said first frame further includes establishing and synchronizing a communication link between said first telecommunications node and said second telecommunications node; and
   transmitting a second frame formatted in accordance with a second communications protocol for transporting said user data over said communication link between said first telecommunications node and said second telecommunications node, said second frame has a greater user payload than capable in the first frame because a portion of the synchronization data in the first frame is replaced with additional data, wherein said user data includes the additional user data.

12. The method of claim 9 wherein said first communications protocol comprises a Global System for Mobile 08.60 based protocol, wherein said first frame comprises a first plurality of words, a first word of said plurality of words is initialized with a value of zeros and a plurality of first bits of remaining words of said plurality of words are initialized with values of ones for synchronizing.

13. The method of claim 9 wherein said second communications protocol comprises a modified Global System for Mobile 08.60 based protocol, wherein said second frame comprises a second plurality of words, a first word of said second plurality of words is initialized with a value of zeros and a first bit of a second word is initialized with a value of one for synchronizing.

14. The method of claim 11 wherein said second frame further comprises an indication for indicating that the second frame is transported utilizing said second communications protocol.

15. The method of claim 11 wherein said first telecommunications node comprises a transcoder/rate adaptor unit.

16. The method of claim 11 wherein said second telecommunications node comprises a base transceiver station.

17. The method of claim 9 further includes detecting a frame slip within the second frame.

18. A communications system for transporting user data between a first telecommunications node and a second telecommunications node within a public land mobile network, said first telecommunications node and said second telecommunications node connected using a communication link, comprising:
   a first data frame transportable over said communication link for establishing and synchronizing a communications channel between said first telecommunications node and said second telecommunications node, said first data frame formatted in accordance with a first frame protocol and includes synchronization data; and
   a second data frame transportable over said communication link for transporting said user data between said first telecommunications node and said second telecommunications node, said second data frame formatted in accordance with a second frame protocol having greater user payload than capable in the first frame protocol because a portion of the synchronization data in the first data frame is replaced with additional data, wherein said user data includes the additional user data.

19. The system of claim 18 wherein said first frame protocol comprises a Global System for Mobile 08.60 based protocol wherein said first data frame further comprises a first plurality of data words, a first word of said first plurality of data words is initialized with a value of zeroes and a plurality of first bits of remaining words of said first plurality of data words are initialized with values of ones for synchronizing.

20. The system of claim 18 wherein said second frame protocol comprises a modified Global System for Mobile 08.60 based protocol wherein, said second data frame further comprises a second plurality of data words, a first word of said second plurality of data words is initialized with a value of zeros and a first bit of a second word of said second plurality of data word is initialized with a value of one for synchronizing, and remaining ones of said second plurality of data words include said user data.

21. The system of claim 18 wherein said first telecommunications node comprises a Transcoder/Rate Adaptor Unit.

22. The system of claim 18 wherein said second telecommunications node comprises a base transceiver station.

23. The system of claim 18 wherein said first frame protocol is capable of transporting said user data at a rate of 13.5 Kbit/s.

24. The system of claim 18 wherein said second frame protocol is capable of transporting said user data at a rate of 14.4 Kbit/s or greater.

25. The system of claim 18 wherein said second data frame further includes an indication for indicating that said second data frame is transported using said second frame protocol.

26. The system of claim 15 wherein a selected one of the first telecommunications node and the second telecommunications node further includes a search window for detecting a frame slip within the second data frame.

* * * * *

UNITED STATES PATENT AND TRADEMARK OFFICE
CERTIFICATE OF CORRECTION

PATENT NO. : 5,892,802
DATED : April 6, 1999
INVENTOR(S) : Stefan Jung et al.

It is certified that error appears in the above-identified patent and that said Letters Patent is hereby corrected as shown below:

<u>Column 8,</u>
Lines 20 and 27, replace "The method of claim 9" with -- The method of claim 11 --
Line 42, replace "The method of claim 9" with -- The method of claim 11 --

<u>Column 10,</u>
Line 12, replace "The method of claim 15" with -- The method of claim 18 --

Signed and Sealed this

Ninth Day of March, 2004

JON W. DUDAS
*Acting Director of the United States Patent and Trademark Office*